United States Patent [19]

Farmer, Jr. et al.

[11] Patent Number: 5,238,490
[45] Date of Patent: Aug. 24, 1993

[54] PROCESS FOR GENERATING COPPER PYRITHIONE IN-SITU IN A PAINT FORMULATION

[75] Inventors: Douglas A. Farmer, Jr., Madison; Rahim Hani, Cheshire; Craig Waldron, Waterbury, all of Conn.

[73] Assignee: Olin Corporation, Cheshire, Conn.

[21] Appl. No.: 24,021

[22] Filed: Mar. 1, 1993

Related U.S. Application Data

[63] Continuation-in-part of Ser. No. 940,555, Sep. 4, 1992.

[51] Int. Cl.$^5$ ............................................... C09D 5/14
[52] U.S. Cl. ............................... 106/18.33; 106/16; 106/18.34; 514/188; 514/345; 514/499; 514/500; 504/121
[58] Field of Search ............... 106/15.05, 16, 18.33, 106/18.34; 504/121; 514/188, 345, 499, 500

[56] References Cited

U.S. PATENT DOCUMENTS

| | | | |
|---|---|---|---|
| 3,615,744 | 10/1971 | Yokoo et al. | 106/15.05 |
| 4,039,312 | 8/1977 | Patru | 106/16 |
| 4,581,351 | 4/1986 | Berke et al. | 514/345 |
| 4,918,147 | 4/1990 | Yamamori et al. | 424/78 |
| 5,057,153 | 10/1991 | Ruggiero | 106/18.33 |
| 5,098,473 | 3/1992 | Hani et al. | 106/18.33 |
| 5,112,397 | 5/1992 | Farmer, Jr. et al. | 106/18.33 |
| 5,137,569 | 8/1992 | Waldron et al. | 106/18.33 |
| 5,185,033 | 2/1993 | Hani et al. | 106/18.33 |

FOREIGN PATENT DOCUMENTS 108634  6/1984  European Pat. Off.
91/14743 10/1991  PCT Int'l Appl.

Primary Examiner—Karl Group
Assistant Examiner—Anthony J. Green
Attorney, Agent, or Firm—Dale Lynn Carlson

[57] ABSTRACT

The present invention relates generally to paints and paint bases, and, more specifically to a process for providing in situ generation of copper pyrithione biocide in a paint or paint base which comprises incorporating a compound of pyrithione, cuprous oxide and a controlled amount of water into the paint or paint base either during or after formulation of the paint or paint base.

11 Claims, No Drawings

PROCESS FOR GENERATING COPPER PYRITHIONE IN-SITU IN A PAINT FORMULATION

This application is a continuation-in-part of application Ser. No. 07/940,555, filed Sept. 4, 1992, now pending.

FIELD OF THE INVENTION

The present invention relates generally to paints and paint bases, and, more specifically to a process for generating copper pyrithione biocide in-situ in a paint formulation.

BACKGROUND OF THE INVENTION

Pyrithiones (2-mercaptopyridine-N-oxide, salts thereof, and bis-2,2' derivatives) are known to be excellent biocides in paint formulations. Combinations of zinc pyrithione and cuprous oxide are known to be excellent antifouling agents when formulated into paints and paint bases (i.e., the paint before pigment addition) also containing resin, as disclosed, for example, in U.S. Pat. No. 5,057,153. Unfortunately, however, such paints may have a limited service life due to leaching of the biocide from the paint film during use.

Copper pyrithione is known to have lower solubility in water than zinc pyrithione. Such low solubility would provide an extended period of antimicrobial activity for copper pyrithione relative to zinc pyrithione during use. Unfortunately, copper pyrithione is not commercially available, possibly due to the fact that its manufacture is surprisingly more difficult than the readily available zinc pyrithione, sodium pyrithione and bis-2,2'-pyrithione and its adduct with magnesium sulfate. The present invention overcomes this problem of lack of commercial availability of copper pyrithione by providing for the generation of copper pyrithione in-situ in the paint formulation through the reaction of another pyrithione compound with cuprous oxide in the presence of a controlled amount of water. Such a solution would be highly desired by the paint manufacturing community.

Thus, the present invention provides a solution to the problem. Although individually cuprous oxide, copper pyrithione and other pyrithione compounds are all known biocides, the use of a combination of a pyrithione compound and cuprous oxide in the presence of a controlled amount of water in order to provide in situ generation of copper pyrithione biocide in a paint has not been known heretofore to the knowledge of the present inventors.

SUMMARY OF THE INVENTION

In one aspect, the present invention relates to a process for the in situ generation of copper pyrithione in a paint or paint base which comprises adding a pyrithione compound and also adding cuprous oxide to a paint or paint base in the presence of water or a water-containing solvent sufficient to provide an amount of water of at least about 0.02 wt. %, based upon the weight of the paint or paint base, to cause formation of copper pyrithione in the paint or paint base.

In another aspect, the present invention relates to a process for the in situ generation of copper pyrithione biocide in a paint or paint base which comprises adding a non-copper compound of pyrithione selected from the group consisting of 2-mercaptopyridine-N-oxide, 2,2'-dithiobis (pyridine-N-oxide), the magnesium salt adduct of 2,2'-dithiobis(pyridine-N-oxide), and combinations thereof, and also adding cuprous oxide, to a paint or paint base in the presence of water or a water-containing solvent sufficient to provide an amount of water of at least about 0.02 wt. %, based upon the weight of the paint or paint base, to cause formation of copper pyrithione in the paint or paint base.

These and other aspects of the present invention will become apparent upon reading the following detailed description of the invention.

DETAILED DESCRIPTION OF THE INVENTION

It has now been surprisingly found in accordance with the present invention that cuprous oxide reacts with non-copper compounds of pyrithione in the presence of a controlled amount of water to produce copper pyrithione. This reaction occurs in-situ in a paint or paint base (i.e., the paint before pigment addition) formulation containing other conventional paint ingredients to produce a paint with superior resistance to marine fouling compared to a similar paint containing a simple mixture of a pyrithione compound and cuprous oxide. The superior antifouling performance of copper pyrithione can be attributed to the fact that copper pyrithione is less soluble in water than other compounds, such as the zinc salt, of pyrithione (about 1-2 ppm for copper versus about 8-10 ppm for zinc) and, therefore, remains in the dry paint film longer, particularly when employed in a marine paint when exposed to the marine environment.

Pyrithiones in general are known to be excellent paint biocides, especially marine paint antifouling biocides. Differences in antifouling performance from one pyrithione to another are due essentially to differences in solubility among them. Without wishing to be bound by any particular theory, it is believed by the present inventors that the pyrithione moiety is the active biocide, while the specific derivative controls the solubility and, therefore, the rate of removal from the dry paint film of the pyrithione by the aqueous marine environment.

Unfortunately, copper pyrithione is not commercially available, possibly due to the fact that its manufacture is surprisingly more difficult than the readily available zinc pyrithione, sodium pyrithione and bis-2,2'-pyrithione and its adduct with magnesium sulfate. The present invention overcomes this problem of lack of commercial availability of copper pyrithione by providing for the generation of copper pyrithione in-situ in the paint formulation through the reaction of the other pyrithione compound with cuprous oxide in the presence of a controlled amount of water.

The present invention is suitable for use in the fabrication of both latex and solvent-based paints and paint bases. The controlled amount of water employed in the process of the present invention is an amount of at least 0.02 wt. %, but more preferably at least 0.05 wt. %. In the presence of this controlled amount of water the cuprous oxide and the pyrithione compound react to form copper pyrithione in-situ. When fabricating a solvent-based paint, it is preferred that the amount of water not exceed 5% by weight based upon the weight of the paint or paint base since incompatibility of water with other components of the paint formulation can occur when using solvent-based paints. When using water-based paints, of course, this incompatibility does not occur, enabling much higher amounts of water (e.g., 50 wt. % or higher) to be suitably employed in the paint or paint base.

The amounts of pyrithione compound and cuprous oxide employed in the process of the present invention are not narrowly critical. However, in order for the complete conversion of the added pyrithione to copper pyrithione, the cuprous oxide is added in at least a stoichiometrically equivalent amount to the number of equivalents of added pyrithione. In addition, sufficient cuprous oxide and pyrithione are added to provide a biocidally effective mixture of copper pyrithione and cuprous oxide in the finished paint formulation. The amount of pyrithione employed is suitably between about 1% and about 25% (preferably 5-25%, more preferably 5-15%) and the amount of cuprous oxide is suitably between about 20% and about 70%, and the total amount of pyrithione and cuprous oxide is suitably between about 20% and 80% based on the total weight of the paint formulation.

The specific pyrithione used to form copper pyrithione in-situ by reaction with cuprous oxide is not critical. It is only required that the pyrithione used have a greater water solubility than copper pyrithione. Examples of other such pyrithiones are unsubstituted pyrithione, sodium pyrithione, tertiary butyl amine pyrithione, aluminum pyrithione, calcium pyrithione, 2,2'-dithiobis(pyridine-N-oxide) and its adduct with inorganic salts such as magnesium sulfate and the like.

Although the improved biocidal efficacy advantages associated with the present invention are expected to provide advantages when used in a wide variety of paints, including indoor and outdoor household paints, industrial and commercial paints, particularly advantageous results are obtained when the process and composition of the present invention are utilized in conjunction with marine paints for use, for example, on ship's hulls. In addition, the composition and process of the present invention provides highly desirable results in the context of exterior paints of both the latex and alkyd types.

Typically, a paint will contain a resin, an organic solvent (such as xylene or methylisobutylketone), a pigment, and various optional additives such as thickening agent(s), wetting agents, and the like, as is well-known in the art. The resin is preferably selected from the group consisting of vinyl, alkyd, epoxy, acrylic, polyurethane and polyester resins, and combinations thereof. The resin is preferably employed in an amount of between about 20% and about 80% based on the weight of the paint.

In addition, the paint composition of the present invention optionally additionally contains optional additives which have a favorable influence on the viscosity, the wetting power and the dispersibility, as well as on the stability to freezing and electrolytes and on the foaming properties. The total amount of optional additives is preferably no greater than 20% by weight, more preferably between about 1% and about 5% by weight, based upon the total weight of the paint composition.

Illustrative thickening agents include cellulose derivatives, for example methyl, hydroxyethyl, hydroxypropyl and carboxymethyl cellulose, poly(vinyl alcohol), poly (vinylpyrolidone), poly(ethylene-glycol), salts of poly(acrylic acid) and salts of acrylic acid/acrylamide copolymers.

Suitable wetting and dispersing agents include sodium polyphosphate, aryl or alkyl phosphates, salts of low-molecular-weight poly(acrylic acid), salts of poly(ethane-sulfonic acid), salts of poly (vinylphosphonic acid), salts of poly(maleic acid) and salts of copolymers of maleic acid with ethylene, 1-olefins with 3 to 18 carbon atoms and/or styrene.

In order to increase the stability to freezing and electrolytes there may be added to the paint composition various monomer 1,2-diols, for example glycol, propylene-glycol-(1,2), and butylene-glycol-(1,2) or polymers thereof, or ethoxylated compounds, for example reaction products of ethylene oxide with longchain alkanols, amines, carboxylic acids, carboxylic acid amides, alkyd phenols, poly(propylene-glycol) or poly(butylene-glycol).

The minimum temperature of film formation (white point) of the paint composition may be reduced by adding solvents, such as ethylene-glycol, butyl-glycol, ethyl-glycol acetate, ethyl-diglycol acetate, butyl-diglycol acetate, benzene or alkylated aromatic hydrocarbons. As defoaming agents there are suitable for example poly(propylene-glycol) and polysiloxanes.

As briefly discussed above, the antifouling performance of paints containing copper pyrithione is superior to those containing other pyrithiones because copper pyrithione is less soluble in water than the other pyrithiones. It therefore leaches out of the subsequently formed dry paint film more slowly than the other pyrithiones and provides longer lasting antifouling protection.

The paint composition of the present invention may be used as a paint for natural or synthetic materials, for example wood, paper, metals, textiles and plastics. It is particularly suitable as an outdoor paint, and is excellent for use as a marine paint.

If a marine paint is being fabricated, the paint preferably contains a swelling agent to cause the paint to gradually "slough off" in its marine environment, thereby causing renewed biocidal efficacy of newly exposed biocide (i.e., the copper pyrithione plus the cuprous oxide) at the surface of the paint in contact with the water medium of the marine environment. Illustrative swelling agents are naturally-occurring or synthetic clays, such as kaolin, montomorillonite (bentonite), clay mica (muscovite), and chlorite (hectonite), and the like. In addition to clays, other swelling agents, including natural or synthetic polymers, such as that commercially available as POLYMERGEL, have been found to be useful in the compositions of the present invention to provide the desired abrasive "sloughing off" effect. Swelling agents can be used singly or in combination. The total amount of optional additives is preferably no greater than 20% by weight, more preferably between about 1% and about 5% by weight, based upon the total weight of the paint composition.

The invention is further illustrated by the following Examples. Unless otherwise stated, the "parts" and "%" are "parts by weight" and "percent by weight", respectively based upon the weight of the paint or paint base.

While the invention has been described above with references to specific embodiments thereof, it is apparent that many changes, modifications and variations can be made without departing from the inventive concept disclosed herein. Accordingly, it is intended to embrace all such changes, modifications and variations that fall within the spirit and broad scope of the appended claims. All patent applications, patents and other publications cited herein are incorporated by reference in their entirety.

EXAMPLE 1

In Situ Generation of Copper Pyrithione in a Paint

A stock solvent mixture was prepared by mixing xylene and methylisobutyl ketone in a 60:40 weight ratio and then adding sufficient water to water to provide a mixture containing about 0.2% water. The mixture was analyzed for water by Karl Fisher titration and found to contain 0.17% water. A paint was made from the following ingredients (amounts shown are in grams):

| Ingredient | Amount |
| --- | --- |
| Zinc Pyrithione | 12.0 |
| VAGH Resin | 5.8 |
| Cuprous Oxide | 140.0 |
| Wood Rosin WW | 12.0 |
| Stock Solvent | 70.0 |

A one pint can was charged with the VAGH resin (a terpolymer of vinyl alcohol, vinyl acetate, and vinyl chloride manufactured by the Union Carbide Corporation) dissolved in 20.5 grams of the stock solvent. Next were added the cuprous oxide and the zinc pyrithione gradually using an additional 12.0 grams of solvent to aid mixing. These materials were ground in a high speed disperser at 7000 rpm for one hour. A water bath was used to keep the temperature of the mixture at a maximum of 45° C. Then the wood rosin was predissolved in the balance of the solvent mixture and added to the formulation. Mixing was continued for an additional hour at 4000 rpm. The formulation was cooled to room temperature and weighed. Solvent lost to evaporation was replaced. Based on the water content of the solvent used, this formulation contained 0.05% water. After standing for one day, formation of green solids characteristic of copper pyrithione was observed in the formulation. Analysis by infrared adsorption spectroscopy (attenuated total reflectance) showed no band at 821.5 cm$^{-1}$, which is characteristic of zinc pyrithione, but a strong band at 831.2 cm$^{-1}$, which is characteristic of copper pyrithione.

EXAMPLE 2

Another Example—In-situ Generation of Copper Pyrithione

A second paint was made as follows:

| Ingredient | Amount |
| --- | --- |
| t-Butyl amine pyrithione | 20.0 |
| VAGH Resin | 11.7 |
| Disperbyk 163 | 8.0 |
| Cuprous Oxide | 225.0 |
| Tricresyl Phosphate | 10.5 |
| Wood Rosin WW | 19.0 |
| Stock Solvent | 113.0 |

The procedure of example 1 was followed exactly. The Disperbyk 163 (wetting agent) and tricresyl phosphate (thickener) were added during the high speed pigment grind. Based on the water content of the solvent, this formulation contained 0.05% water. After one day formation of the characteristic green solids of copper pyrithione was observed in the formulation. This example shows that pyrithione salts other than zinc pyrithione may be used to react with cuprous oxide to form copper pyrithione.

COMPARATIVE EXAMPLE A

Comparative Example Showing Using a Water-free paint

As a comparison, a third paint was made as follows:

| Ingredient | Amount |
| --- | --- |
| Zinc Pyrithione | 7.75 |
| VAGH Resin | 3.9 |
| Molecular Sieves | 16.0 |
| Disperbyk 163 | 2.7 |
| Cuprous Oxide | 75.0 |
| Tricresyl Phosphate | 3.6 |
| Wood Rosin WW | 7.75 |
| Stock Solvent | 43.0 |

The procedure of example 1 was followed. The molecular sieves used were type 4A. powdered (Aldrich Chemical Company). The molecular sieves were added immediately after charging the reactor with VAGH and solvent. The use of the molecular sieves caused removal of all water from the solvent system of the formulation and thus prevented the reaction between zinc pyrithione and cuprous oxide. No characteristic green solids of copper pyrithione were observed.

EXAMPLE 3

Another Example—In-situ Generation of Copper Pyrithione

A fourth paint was made as follows:

| Ingredient | Amount |
| --- | --- |
| Pyrithione Acid* | 6.85 |
| VAGH Resin | 3.90 |
| Disperbyk 163 | 2.70 |
| Cuprous Oxide | 75.00 |
| Tricresyl Phosphate | 3.60 |
| Wood Rosin WW | 6.85 |
| Stock Solvent | 38.00 |

*2-mercaptopyridine-N-oxide

The procedure of examples 1 and 2 was followed exactly. Based on the water content of the solvent this formulation contained 0.05% water. After one day formation of the characteristic green solids of copper pyrithione was observed in the formulation. Analysis by infrared absorption spectroscopy (attenuated total reflectance) showed a strong band at 831.3 cm$^{-1}$, which is characteristic of copper pyrithione.

EXAMPLE 4

Another Example—In-situ Generation of Copper Pyrithione

A fifth paint was made as follows:

| Ingredient | Amount |
| --- | --- |
| Bispyrithione* | 6.85 |
| VAGH Resin | 3.90 |
| Disperbyk 163 | 2.70 |
| Cuprous Oxide | 75.00 |
| Tricresyl Phosphate | 3.60 |
| Wood Rosin WW | 6.85 |
| Stock Solvent | 38.00 |

*2,2'-dithiobis(pyridine-N-oxide

The procedure of examples 1 and 2 was followed exactly. Based on the water content of the solvent this formulation contained 0.05% water. After one day formation of the characteristic green solids of copper pyrithione was observed in the formulation. Analysis by infrared absorption spectroscopy (attenuated total reflectance) showed a strong band at 831.3 cm$^{-1}$, which is characteristic of copper pyrithione.

In an additional experiment, the magnesium sulfate adduct of bispyrithione was substituted for the bispyrithione in the above-described formulation, and the observed result was identical to that obtained for the bispyrithione experiment.

What is claimed is:

1. A process for the in situ generation of copper pyrithione biocide in a paint or paint base which comprises adding a non-copper compound of pyrithione selected from the group consisting of 2-mercaptopyridine-N-oxide, 2,2'-dithiobis(pyridine-N-oxide), the magnesium salt adduct of 2,2'-dithiobis(pyridine-N-oxide), and combinations thereof, and also adding cuprous oxide, to a paint or paint base in the presence of water or a water-containing solvent sufficient to provide an amount of water of at least about 0.02 wt. %, based upon the weight of the paint or paint base, to cause formation of copper pyrithione in the paint or paint base.

2. The process of claim 1 wherein said pyrithione compound is 2-mercaptopyridine-N-oxide.

3. The process of claim 1 wherein said pyrithione compound is 2,2'-dithiobis(pyridine-N-oxide).

4. The process of claim 1 wherein said pyrithione compound is the magnesium salt adduct of 2,2'-dithiobis(pyridine-N-oxide).

5. The process of claim 1 wherein said compound of pyrithione is present in an amount of between about 1% and about 25%, and said cuprous oxide being present in an amount of between about 20% and about 70%, and the total amount of said compound of pyrithione plus said cuprous oxide is between about 20% and about 80% based upon the total weight of the paint or paint base.

6. The process of claim 1 wherein the total amount of said compound of pyrithione plus said cuprous oxide is between about 20% and about 75% based upon the total weight of the paint or paint base composition.

7. The process of claim 1 wherein said composition additionally contains a resin selected from the group consisting of vinyl, alkyl, epoxy, acrylic, polyurethane and polyester resins, and combinations thereof.

8. The process of claim 1 wherein said composition additionally contains a swelling agent selected from the group consisting of natural and synthetic clay and natural and synthetic polymer swelling agents.

9. The process of claim 8 wherein said swelling agent is selected from the group consisting of kaolin, montomorillonite (bentonite), clay mica (muscovite), and chlorite (hectonite), and combinations thereof.

10. The process of claim 1 wherein said paint or paint base is solvent based and wherein said amount of water does not exceed 5 wt. % based upon the weight of the paint or paint base.

11. The process of claim 1 wherein said paint or paint base is water-based and wherein said amount of water does not exceed 50 wt. % based upon the weight of the paint or paint base.

* * * * *